H. M. CROUSE AND G. G. NEWELL.
COMBINED AUTOGRAPHIC REGISTER AND RECORDING MACHINE.
APPLICATION FILED APR. 19, 1916.

1,366,718. Patented Jan. 25, 1921.
5 SHEETS—SHEET 1.

UNITED STATES PATENT OFFICE.

HENRY M. CROUSE, OF CHICAGO, AND GEORGE G. NEWELL, OF CONGRESS PARK, ILLINOIS.

COMBINED AUTOGRAPHIC REGISTER AND RECORDING-MACHINE.

1,366,718.     Specification of Letters Patent.     Patented Jan. 25, 1921.

Oirginal application filed June 5, 1915, Serial No. 32,293. Divided and this application filed April 19, 1916. Serial No. 92,092.

*To all whom it may concern:*

Be it known that we, HENRY M. CROUSE and GEORGE G. NEWELL, citizens of the United States, residing at Chicago and Congress Park, respectively, in the county of Cook and State of Illinois, have invented certain new and useful Improvements in Combined Autographic Registers, and Recording-Machines, of which the following is a specification.

This application is a division of our application for Letters Patent for autographic register filed June 5, 1915, Serial Number 32,293, and it relates to combined registers and recorders; the object of the invention being to provide means whereby an autographic register mechanism may be connected with a recording machine in a manner whereby the operative parts of the two machines are so interconnected that the operator is compelled to manipulate the recording mechanism to print the itemized amount of sales, the sales clerk's number, department number, class of goods, or other desired matter, autographically registered, upon the record ribbon carried by the recording mechanism before the paper advancing means of the register may be moved toward a check delivering position, to provide means whereby, if from any cause a printed blank has been mutilated or spoiled, the recording mechanism may be manipulated in a manner to release the paper advancing means of the register and to indicate upon the record ribbon of the recorder the word "Void" in correspondence with the wasted slips of record deposited in the casing of the register; to provide means whereby a correction may be made in the operation of the recording mechanism, and to provide mechanism sealed against manipulation by the operator and operative to record a total of the several amounts as taken from the register slips.

We attain these objects by means of the mechanism illustrated in the accompanying drawings, in which—

Fig. 9ª is a top plan view of detail parts of Fig. 9;

Referring to the drawings, wherein the same reference numerals designate like parts throughout the several views, the recorder includes a casing 1, which is mounted upon supporting legs 2, and having side walls 3, rear wall 4, and a door 5 at its front end hinged to one of the side walls, a top wall 6, and a bottom 7.

Formed in the top wall 6, near the middle thereof, is a rectangular opening 8, and 9 represents a series of supporting sockets upon the front wall 4 above the hinged door 5, and 10 a like series of sockets upon the rear end wall 5, said sockets being in longitudinal alinement with each other, and 11 a series of trackways secured thereto. Slidably mounted upon the trackways 11 are a series of selector keys 12 that are normally held toward the rear end of the casing by means of coiled tension springs 13, having one end thereof connected with the rear end wall of the casing at 14, and their opposite ends to the selector keys 12 on their under sides by means of screw eyes 15. The selector keys abut at their rear ends against a cushioning strip 16 mounted above the trackways adjacent the supporting sockets 10 at the rear of the casing.

Figures 10, 11, 12, 13, 14:
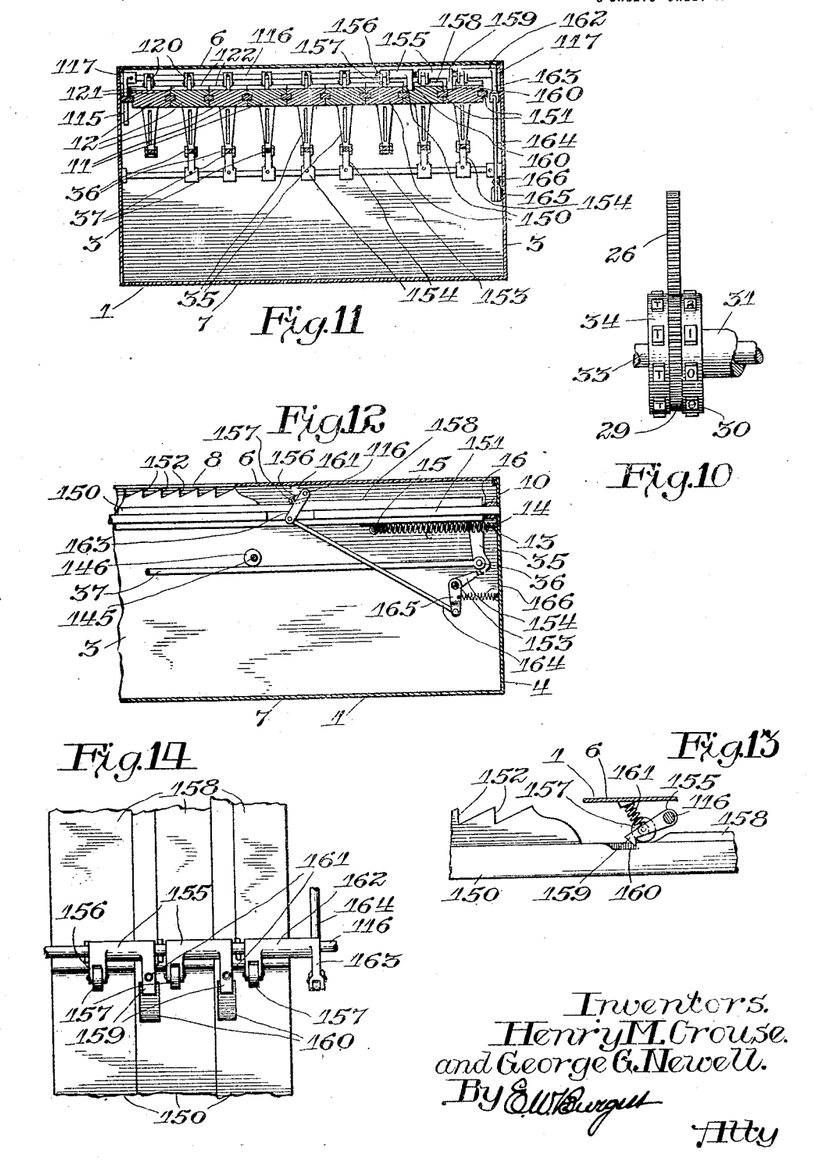
Fig. 10 is a detached detail of the mechanism illustrating the form of a totals wheel forming part of the recording mechanism.
Fig. 11 is a vertical cross section of the case containing the recording mechanism and showing a part of the selector key controlling means.
Fig. 12 is a sectional side elevation of the mechanism shown in Fig. 11.
Fig. 13 is an enlarged side elevation of a detail part of Fig. 12.
Fig. 14 is a top plan view of part of Fig. 11.

Formed upon each selector key, and upon their under sides, are a series of rack teeth 17 that are adapted to mesh with pinions 18 journaled upon a transversely disposed shaft 19, having its opposite ends carried by the side walls of the casing. Formed integral with each pinion 18, and on one side thereof, is a hub 20, said hub having oppositely disposed radial arms 21 and 22, upon which are mounted spring actuated pawls 23 and 24, respectively, said pawl 23 being adapted to engage with the teeth of a ratchet wheel 25 secured to a transmission gear 26 loosely journaled upon the shaft 19. Mounted between each of the pinions 18 and transmission gears 26 on the shaft 19, are spacer sleeves 27. Secured to the ratchet wheel 25 and having the teeth thereof reversely disposed relative to the teeth of the ratchet wheel 25, is a second ratchet wheel 28 adapted to be engaged by the pawl 24. Meshing with each transmission gear 26 are gears 29, each of said gears being secured to a totals wheel 30. Formed on one side of each totals wheel is a hub 31, and integral with each hub is an intermittently operative ratchet wheel 32. All of said parts 29, 30, 31 and 32 are loosely mounted upon a transversely and horizontally disposed shaft 33 journaled in bearings carried by the side walls of the casing. The totals wheel at the right-hand of the series is provided upon the opposite side of its pinion with a supplemental wheel 34 carrying letters T that are printed upon the record strip opposite each total that is made, as shown in Fig. 10. Depending downwardly from the rear ends of each of the selector keys 12 is an extension 35, and pivotally connected with each of said extensions at one end, as shown at 36, is a combined stop and numeral bar 37, each of said bars being supported at its opposite end by means of a spring 38 connecting it with the forward end of one of the selector keys 12. Located adjacent the front end of the rectangular opening 8 is a transversely disposed stop bar 39, extending the full width of the opening and provided with depending portions 40 at its opposite ends that are pivoted near their centers to the side walls of the casing and at their lower ends to the front ends of bars 41 slidably mounted in ways 42 secured to the side walls of the casing, the bars being connected at their rear ends to a transversely disposed tooth engaging bar 43 adjacent the pinions 18, and 44 represents tension springs, having one end secured to a fixed part of the mechanism and their opposite ends to the bars 41 and normally operative to hold the engaging bars 43 out of engagement with the teeth of the pinions 18 and the stop bar 39 toward the rear end of the machine.

45 represents lever arms disposed upon opposite sides of the machine, within the casing, and having their rear ends pivotally connected at 46 with the side walls thereof and extending forward are provided with depending arms 47, having forwardly turned step portions 48 that are engaged by pressure rolls 49 journaled upon the free ends of arms 50 secured to a transversely disposed rock shaft 51 journaled in bearings 52 secured to the side walls of the case and 53 represents a striking and engaging bar disposed transversely across the machine and having its opposite ends secured to the lever arms 45 intermediate their ends. In order to retain the striking bar 53 in an inactive position, tension springs 54 are provided, having their lower ends connected with the levers 45 and their upper ends with the upper wall of the case, and 55 represents stop blocks secured to the side walls of the case and operative to limit an upward swing of the free ends of the levers 45. Located under and adjacent the front ends of the stop and numeral bars 37 is an inking roller 56, which is journaled upon a shaft 57, that is swingingly carried by the front ends of arms 58, having their rear ends pivotally connected with the side walls of the case, and 59 represents tension springs connected with the arms and operative to hold the inking roller in engagement with the numeral blocks 60 formed on the under side of the numeral bars 37. Formed upon the upper side of each of the numeral bars 37 are a series of engaging members 61, spaced apart and disposed on said bars above and opposite the numeral blocks 60. Adjacent the inking roller 56, and disposed transversely across the case parallel with the inking roller, is a feed roller 62, which is rotatably mounted upon a shaft 63, having its opposite ends secured to the side walls of the case. Secured to opposite ends of the feed roller are ratchet wheels 64, the teeth of which are adapted to be engaged by spring actuated pawls 65, having their upper ends pivotally connected with the lever arms 45, intermediate their ends, and their lower ends normally held in engagement with the teeth of the ratchet wheels by means of tension springs 66. Extending transversely across the case, parallel with their axes, and adjacent the totals wheels 30, is a striking bar 67, having depending arms 68, whereby it is swingingly mounted upon a shaft 69, having its opposite ends secured to the side walls of the case; the striking bar being held in an inactive position by means of tension springs 70 that normally hold it against stop members 71 secured to the side walls of the case. 72 represents a forwardly extending arm on the middle part of the striking bar and adapted to be engaged by a striking lever 73 secured to a rock shaft 74. 75 represents a depending lever having its upper end secured to the shaft 74 and its lower end pivotally connected with the rear end of a link 76, the front end of said link being slidably mounted in a bracket member 77 secured to the bottom of the case and permitting a limited lateral swinging movement of the front end of the link, and 78 represents a plate spring that normally presses the link toward one arm 79 of a bell crank lever, the remaining arm 80 of which is pivotally connected, by means of a link 81, with an arm 82 secured to a vertically disposed hinge member 83 turning with the door 5. The front end of the link member 76 is provided with a laterally disposed inclined block member 84 at one side thereof adjacent the free end of the arm 79 of the bell crank lever, which arm is adapted to engage with the end of the block 84 in a manner to push the link member 76 rearward and thereby rock the shaft 74 in a direction to cause the striking lever 73 secured thereto to swing the striking bar 67 toward the axis of the totals wheels 30 when the door 5 is opened, and thereby actuate the bell crank, and when the door is closed the free end of arm 79 rides upon the inclined portion of the block 84, thereby pushing the free end of link member 76 laterally until the arm 79 passes the shoulder upon the block, and the spring 78 then returns the link member to its normal position. 85 represents a stop member secured to a side wall of the case and adapted to engage with an arm 86 secured to the rock shaft 74 in a manner to limit a rocking movement of the shaft in one direction.

Mounted upon a transversely disposed shaft 87, near the center of the case, is a roll of record paper 88 which is adapted to receive printed characters during the operation of the machine. The paper from the roll passes under guide rollers 89, one of said guide rollers being journaled upon the shaft 69 of the striking bar 67. Continuing, the paper passes between a roller 90, which is carried by the arms 68 of the striking bar, and the striking bar 67 and continuing on, passes under another roller 91, and around the periphery of the feed roller 62, then under a roller 92, out toward the front of the machine adjacent the door 5, where it is loosely retained in a semi-folded form, or it may be wound upon an automatically operating receiving roll if preferred.

Extending across the case below the bars 37, and adjacent the paper roll 88, is a supporting bar 93, having its opposite ends secured to the side walls of the case. Pivotally mounted upon said bars are a series of spring actuated retaining hooks 94 that are adapted to engage against one side of each of the stop and numeral bars 37. Formed on the upper side of each bar 37, adjacent the point of engagement of the hooks 94, are cutaway inclined gaps 95. Located adjacent the under side of the totals wheels 30, and bearing against said wheels, is an inking roller 96.

Figure 9:
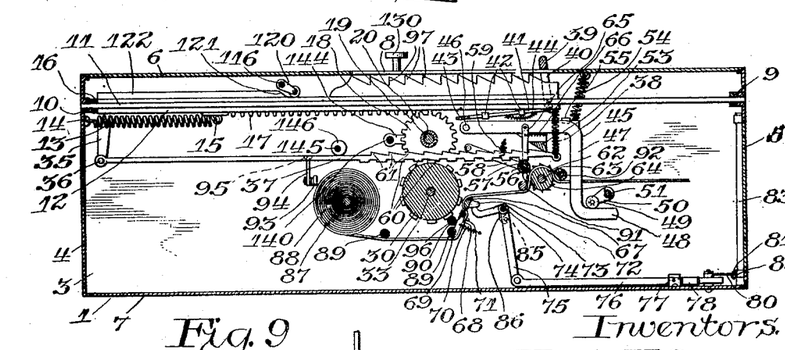
Fig. 9 is an open side elevation of the recording mechanism designed to illustrate the operation of the totals recording mechanism.
Figure 9A:
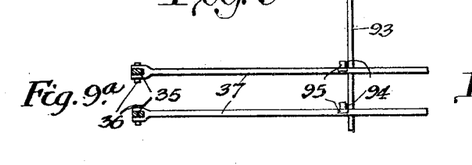

In the operation of the recording mechanism as described, assume that the first number of a column of figures to be added is "345." Said number is selected on the first three selector keys to the left. As the fingers of the hand are directed to one or all of the selected numbers, each finger will engage one of the projections 97. There are a series of these projections on each of the selector keys 12. The selector keys are drawn toward the front of the machine until the fingers of the operator engage against the stop bar 39. As each selector bar 12 is moved the rack teeth 17 formed on the under side thereof will engage one of the pinions 18. By reason of each pinion having a hub portion 20, the pawl 23 that is carried by said hub will engage the ratchet wheel 25, and the ratchet wheel will then carry the transmission gear 26. The transmission gear will then rotate the totalizing wheel 30 through the gear 29. It is to be noted that when each selector bar is moved it carries with it the combined stop and numeral bar 37. In the instance of carrying the selected numeral "3," said numeral will be drawn toward the front of the machine until stopped by the operator's finger engaging the stop bar 39. One of the engaging members 61, formed on the bar 37, will be engaged against the striking bar 53, which will hold the selector key in position until after recording. It is to be noted that the number of engaging members 61 is equal to the number of numeral blocks 60, as well as the finger engaging projections 97, so that whatever number is selected on any selector key, said selector key is moved forward to its limit of movement, and one of the engaging members 61 will hold the selector key in its moved position by its engagement with the striking bar 53. Whenever a number has been selected on the selector key, and the selector key has been moved, one of the numeral blocks 60 bearing a number corresponding with the number selected, will be carried forward by the bar 37 and will remain in a recording position over the feed roller 62. After the selector keys bearing the selected numbers "3," "4," "5" have been moved forward and are held in position for recording by the operation just described, the shaft 51 is rocked in a direction to cause the pressure rolls 49 to bear upon the step portions 48 and the striking bar 53 will be carried downwardly, bearing down the bar 37. The numeral blocks 60 carrying the numerals "3," "4," "5" will bear against the paper ribbon, which paper ribbon is engaged by the upper periphery of the feed roller 62, and the numerals "3," "4," "5" will be printed thereupon. When the shaft 51 is rocked in an opposite direction the striking bar 53 is relieved of pressure and the springs 54 will return the striking bar to its normal position and the spring actuated pawls 65, which are carried by said striking bar, will engage the ratchet wheels 64. This will then turn the paper sheet on which the numerals have been recorded a space so as to be ready for the next selected number. At the time the striking bar 53 depressed the bars 37, said bars were depressed to such an extent that the top portion thereof was engaged by a part of their spring retaining hooks 94. As the striking bar 53 was returned to its normal position, the bars 37 of the three selected numbers were held down so that the engaging members 61 of said bars could pass under the striking bar 53 as said bars 37 and the selector keys 12 are returned to their normal positions by the springs 13. At this point the cutaway gaps 95 formed on the upper part of the bars 37 will be in alinement with the spring retaining hooks 94 so that the retaining portion of said hooks will slide off from said bars 37 upon their engagement with the cutaway gaps 95. In order to understand the operation of the returning of the selector keys 12 and bars 37 to their normal positions, an inspection of Fig. 9 shows one of the retaining hooks 94 seated in a gap 95 of one of the bars 37, and when the bar is moved forward the hook in leaving the gap will pull the bar downward, thus holding the engaging members 61 out of engagement with the striking bar 53. As the selector keys 12 are drawn forward in the order in which the numbers thereon are selected and engaged by the operator's fingers, the fingers upon engaging the stop bar 39 will move said stop bar, thus carrying the engaging bar 43 into engagement with the teeth of the transmission gears 26. This is merely to stop the momentum from carrying said gears beyond their intended degree of movement. Each of the transmission gears 26 has mounted thereon a projection 99 which projection, upon continued operation of the selector keys in the order of adding, will engage with the respective intermittent wheel 32 so as to carry the numeral wheel 30 to the next order after a column of figures has been brought down and recorded by the actuation of the selector keys 12, and the striking bar 53, and the total is desired.

Figure 5:
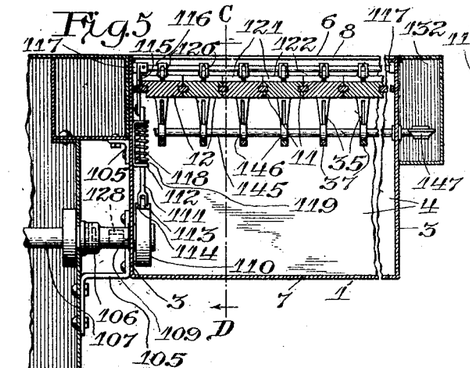
Fig. 5 is a vertical cross section of the recording mechanism and part of the autographic register along line A—B of Fig. 2.
Figure 15:
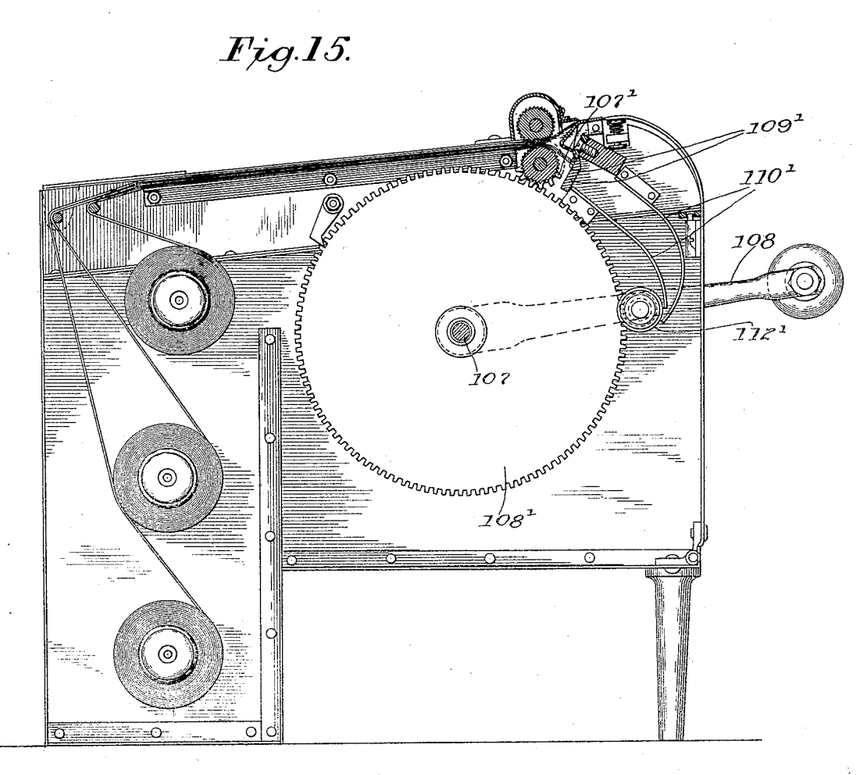
Fig. 15 is a side elevational view partly in section, of the autographic register showing the paper feeding mechanism.

The rock shaft 51 is extended beyond its bearing carried by the side wall of the case adjacent the register, and secured thereto is a lever arm 100 that is normally held in an inactive position by means of a compression spring 101 encircling the body of a link 102, having one end connected with the free end of the arm 100 and its opposite end slidably received by an opening in the front end of a bracket member 103 receiving the spring and secured to the outside wall of the case, the spring being reactive between the end of the bracket and a collar 104 on the link. The case containing the recording mechanism is substantially as one with the case of the register, as shown in Fig. 5 of the drawings, and supported by means of bracket members 105, and 106 represents a coupling member having one end separably connected with the adjacent end of a shaft 107 journaled in the case of the register and having an actuating lever 108 mounted theron, the paper feeding and severing means of the register being operatively connected with said shaft and journaled in a bearing box 109 secured to the side wall of the case containing the recording mechanism, and 110 represents a stop cam secured to its opposite end within the case of the recording mechanism. The paper feeding mechanism of the autographic register is illustrated in Fig. 15 and consists of a pair of corrugated rollers connected by suitable gearing 107′, 108′, to the shaft 107 which is actuated by the crank 108. There is also shown in Fig. 15 the paper severing mechanism which consists of knives 109′ and the paper cutting mechanism which guides the severed strips downwardly into the casing and is embodied in the guiding members 110′. The roller 112′ is actuated by the gear 108′ and feeds the severed strips downwardly into the casing. This structure is all shown in detail in the parent application of which this application is a division, and for this reason has not been illustrated in detail in this application. 111 represents a stop dog slidably mounted in a vertically disposed bracket 112 secured to the wall of the case, having a roller 113 journaled upon its lower end and engaging with a shoulder 114 upon the periphery of the stop cam 110, the upper end of the stop dog being pivotally connected with the free end of an arm 115 secured to a transversely disposed rock shaft 116 journaled in bearings 117 secured to the side walls of the case above the selector keys 12, and 118 represents a compression spring encircling the body of the stop dog and operative between the upper end of the bracket 112 and a pin 119 cargage with the ribbon of paper. When the bar or bars 37 are disengaged, the selector keys are retracted as heretofore described, and the operator may then proceed to manipulate the mechanism in a manner to record the proper amount.

If it is desired to operate either the register or the recording mechanism independently of each other, the coupling member 106 may be disengaged from the shaft 107, thus permitting the actuating lever 108 of the register to be manipulated independently, and the recording mechanism may be used for any other calculating work as desired.

Figure 1:
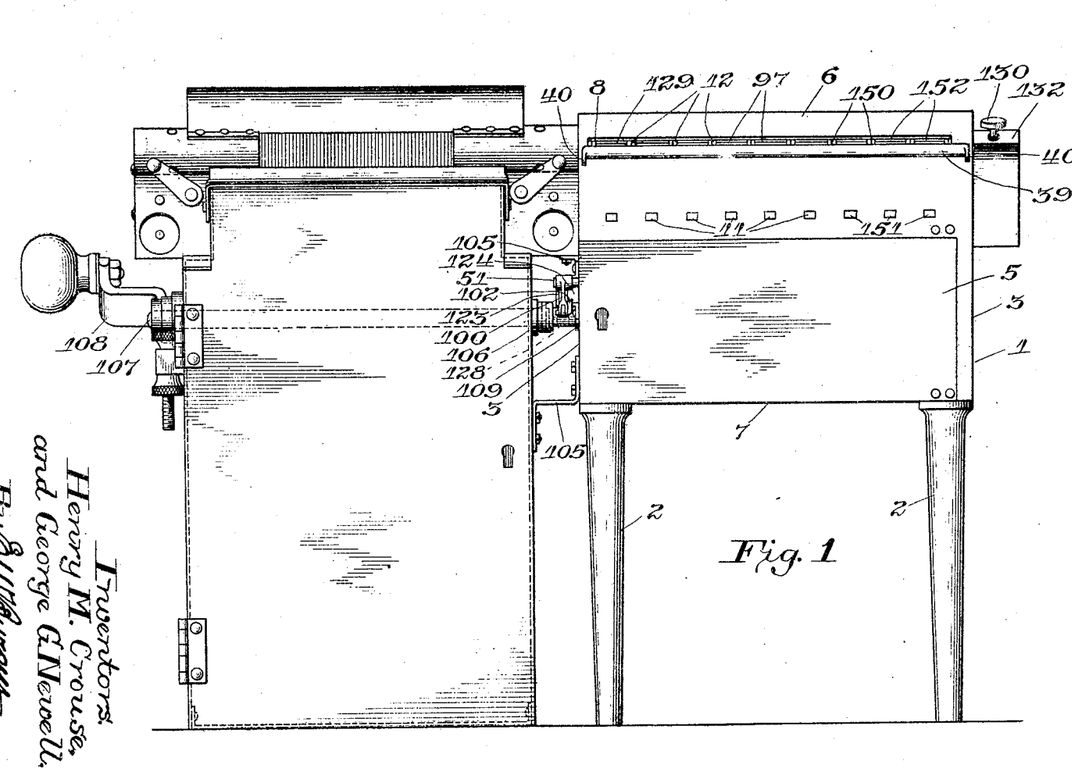
Figure 1 is a front elevation of an autographic register having a recording mechanism connected therewith and embodying our invention.
Figure 2:
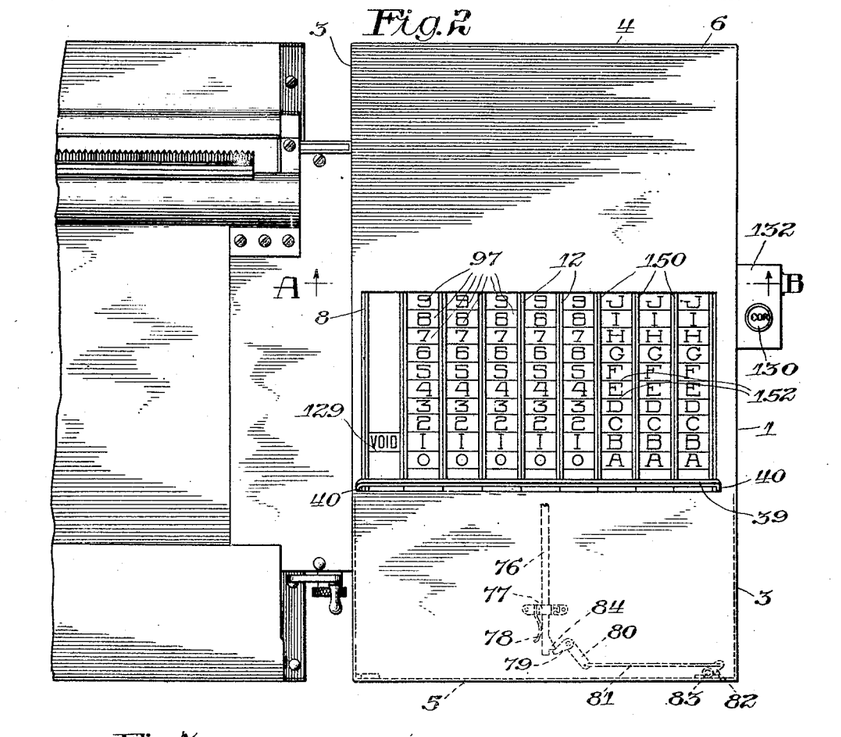
Fig. 2 is a top plan view of the recorder and part of the autographic register as shown in Fig. 1.
Figures 3, 4:
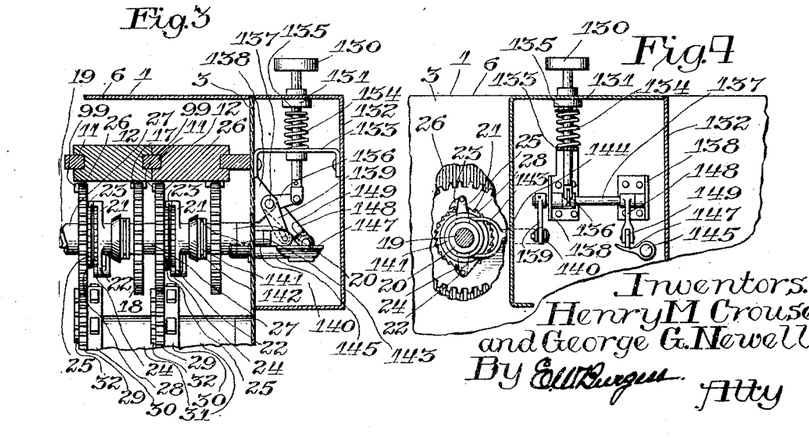
Fig. 3 is a vertical cross section of part of the recording mechanism designed to illustrate the operation and construction of the correction mechanism.
Fig. 4 is a partial end elevation of Fig. 3, with parts broken away to expose.

To make the recording machine more complete in its operation, and as a safeguard against carelessness by the operator, we have provided three supplemental selector keys 150, or more may be applied if desired, at the right-hand side of the case adjacent the selector keys 12, as shown in Fig. 2. The keys 150 are mounted upon trackways 151 in the same manner as the keys 12. One of the keys, preferably that adjacent the right-hand key of the series designated by reference character 12, is provided with a series of finger engaging members 152, the same as 97 upon the keys 12, and these carry letters or numerals identifying the operator; the next key to the right is provided with like finger engaging members that may designate the class of goods sold, or cash, or credit sales, and the one next to that may indicate the department or counter number. The keys 150 are operated in the same way as keys 12, and are controlled in the same manner by tension springs 13, and provided with like depending extensions 35 carrying like combined stop and numeral bars 37 that carry numeral or type blocks like those designated by reference characters 60, and corresponding with the characters upon the finger engaging members 152 upon the supplemental selector keys, the bars being also provided with engaging members like 61 upon their upper sides that are adapted to engage with the striking and engaging bar 53.

153 represents a transverse shaft journaled in bearings carried by the side walls of the case 1 and disposed below the lower end of the extension 35, and 154 represents pawl arms secured to the shaft and adapted to engage with the lower ends of the extensions 35 in a manner to lock the selector keys against movement until the pawl arm is disengaged. Loosely mounted upon the rock shaft 116 are two sleeve members 155, each having at its inner ends forwardly extending arms 156, having rollers 157 journaled upon their free ends that are adapted to engage with raised tracks 158 disposed longitudinally upon the upper sides of the selector keys 150 in a manner to swing the free end of the arm upward and turn the sleeve upon the shaft when the selector key is moved forward in the machine. The sleeves 155 are provided at their opposite ends with pawl arms 159 that are adapted to engage with notches 160 formed in the edge of the adjacent selector key to the right in a manner to lock it against movement until the pawl is released from engagement with the notch. The arms 156 and 159 are normally depressed by means of compression springs 161 interposed between the free ends of the arms 156 and the upper wall of the case. The selector key of the supplemental series carrying the index numbers of the different operators is not locked against movement by the pawl arm 154, and the selector key of the series 12, having the word "Void" as a designating character, is also free to be actuated at any time. When the operator manipulates the key carrying his number, the pawl 159 will be disengaged from the notch in the adjacent key carrying the stock or class numbers, and when that is actuated it releases the next adjacent key of the series carrying the department number. 162 represents a sleeve similar in form to those designated by 155, and having a like spring-pressed arm carrying a roller 157 that engages with a like raised track 158 upon the selector key, and having an arm 163 at its opposite end that is pivotally connected with one end of a link 164 that has its opposite end pivotally connected with the free end of a depending arm 165 secured to the transverse shaft 153 in a manner to rock the shaft in a direction to release the pawl arms 154 from engagement with the extensions 35, and 166 represents a tension spring having one end secured to the end wall of the case and its opposite end to the arm 165 and operative to normally rock the shaft in a direction to cause the pawl arms 154 to lock the selector keys with which they engage against movement.

In the operation of the mechanism as described, the operator must first manipulate the selector key carrying his or her number, and then the next adjacent key carrying the stock number, and next the key carrying the department number, before any of the keys 12 may be manipulated. The rock shaft 145, carrying the eccentric collars 146, disengages the stop and numeral bars 37 of the supplemental selector keys in the same manner as those carried by the selector keys 12, when a mistake has been made and the correction key 130 manipulated.

Figure 6:
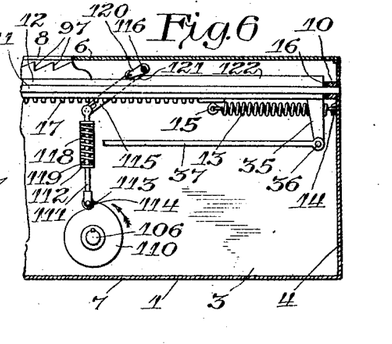
Fig. 6 is a vertical sectional side view of Fig. 5 along line C—D.
Figure 7:
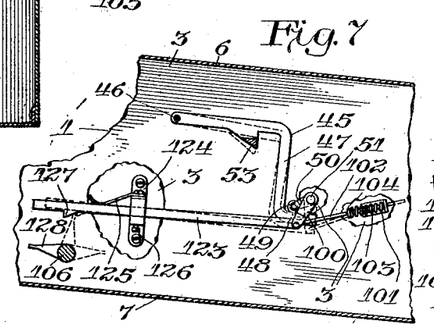
Fig. 7 is a side elevation of part of the recording mechanism designed to illustrate the operative connections between the striking bar of the recording mechanism and the actuating shaft of the autographic register.
Figure 8:
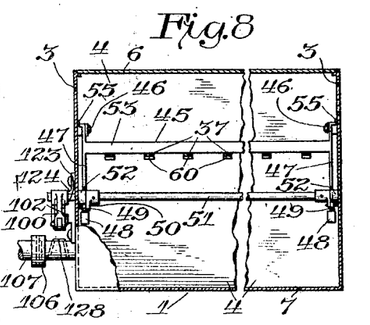
Fig. 8 is an end elevation of Fig. 7.

Having shown and described an embodiment of our invention, we do not desire that it be limited to the precise details of the structure as illustrated, it being understood that changes may be made in the form, proried by the dog in a manner to yieldingly resist an upward sliding movement thereof. The function of the stop dog is to lock the cam 110 against rotation in the direction of the arrow, as shown in Fig. 6 of the drawings.

Secured to the rock shaft 116 are a series of wiper arms 120 that are adapted to engage with inclines 121 at the front ends of trackways 122 formed upon each of the selector keys 12 and adapted to rock the shaft 116 in a direction to lift the stop dog 111 from engagement with the shoulder 114 upon the cam 110 and permit a rocking movement of the shaft 107 and a forward throw of the actuating lever 108 of the register when any of the selector keys has been drawn forward by the operator.

123 represents a trip bar located between the two cases, having its front end pivotally connected with the free end of the arm 100 and its body portion slidably received by a bracket member 124 secured to the adjacent side wall of the case containing the recording mechanism, the bracket permitting a vertical swing of the free end of the bar against the pressure of a plate spring 125, having one end secured to the bracket and its opposite end engaging with the upper side of the trip bar, and 126 represents a regulating screw carried by the bracket that may be adjusted to limit a downward swing of the free end of the bar. 127 represents an inclined block member upon the lower side of the free end of the bar that is adapted to be engaged by a wiper arm 128 carried by the coupling member 106, in a manner to move the trip bar forward and thereby rock the shaft 51 in a direction to actuate the striking bar 53.

In the operation of machines of the class indicated, it is desirable that mechanism be provided that may be manipulated in a manner to indicate that a sales slip, for example, has been improperly filled out or otherwise spoiled, and to print upon the record ribbon of the recording mechanism some reference character denoting such irregularity, and for such purpose we have provided one of the selector keys 12 with a single finger engaging member 129 designated by the word "Void," the other selector keys each having a series of such engaging members designated by numerals, as shown in Fig. 2 of the drawings. The selector key designated by the word "Void" carries with it a stop and numeral bar like those designated by reference numerals 37, excepting that there is only one finger engaging member upon its upper side and one numeral block upon its lower side having the letters forming the word "Void" engraved thereon.

It is further desirable to provide means, if the operator has made a mistake in manipulating any of the selector keys and thereby brought wrong numerals or letters in position to be recorded, that may be operated to return the mechanism to the position it occupied at the end of its last recording operation. The means we have provided to perform this function includes a correction key 130 slidable vertically through a bearing member 131 carried by the upper wall of a small supplemental case 132 secured to the side of the main case; the body of the key being received by an opening in a cross bar 133 having its opposite ends secured to the side walls of the case. 134 represents a compression spring encircling the body of the key above the cross bar and operative between the upper side of the bar and a pin 135 carried by the key to normally hold the head of the key in an elevated position above the top of the case 132. The lower end of the key 130 is pivotally connected to the free end of an arm 136 secured to a rock shaft 137 journaled in bearings 138 secured to the wall of the case, and 139 represents a lever arm secured to the front end of the shaft, having its free end pivotally connected with the extended end of a longitudinally movable bar 140 carried by bearings secured to the side walls of the case containing the recording mechanism. The spring connected with the pawl 24 normally holds it disengaged from the ratchet wheel 28, and slidably mounted upon each of the hub members 20 are conical rings 141, having peripheral channels 142 upon their hub portions that receive the forked ends 143 of shipping members 144 that are secured to the bar 140 and operative to move the rings into engagement with the pawls 24 and cause them to engage with the teeth upon the wheels 28 in a manner to cause a reverse rotation of the transmission gear wheels 26 and 29 when the selector keys 12 are retracted.

Means are provided for disengaging the stop and numeral bars 37 from the striking and engaging bar 53 when the correction key 130 is depressed, including a rock shaft 145 journaled in bearings carried by the side walls of the case and located centrally thereof above the stop bars 37, and 146 represents eccentric collars secured to the shaft 145 and spaced apart in a manner to engage with the upper side of each of the stop bars. 147 represents a fan-shaped arm secured to the end of the shaft 145 that extends into the case 132, and 148 a wiper arm secured to the shaft 137 and having a roller 149 journaled upon its free end that operatively engages with the arm 148 when the correction key 130 is depressed, thereby rocking the shaft 145 and causing the eccentric collars 146 to depress the stop bars 37 sufficient to disengage them from the engaging bar 53, but not far enough to cause them to enportion and organization of its various parts without departing from the spirit of our invention.

What we claim as our invention, and desire to secure by Letters Patent, is:

1. In a machine of the class described, a recording machine including selector keys and operable to record a transaction on a record strip, type bars and a striking bar, an autographic register including paper feeding mechanism for feeding a strip of paper distinct from the strip operated upon by said recording mechanism, an actuating member for said paper feeding mechanism, means operatively connected with said selector keys for controlling said actuating member, and means operatively connected to and positively actuated by said actuating member upon the feeding movement thereof for actuating said striking bar.

2. In a machine of the class described, in combination, a case, a plurality of separate series of longitudinally disposed selector keys arranged side by side and individually slidable longitudinally in said case, means for locking the keys of one series against movement, said means including a transversely disposed shaft mounted in said case, sleeves journaled upon said shaft, pawls carried by said sleeves and adapted to engage the individual keys of said series, pawl controlling elements carried by said sleeves and engaging with an adjacent key in a manner to disengage said pawls successively and in a predetermined sequence, means for locking the keys of the remaining series against movement, said means including a rock shaft mounted in said case, pawls secured to said shaft and adapted to engage with said selector keys, an arm secured to said rock shaft, an arm secured to one of said sleeves, and a link connection between the free ends of said arms whereby an operative movement of one of the keys of said first series imparts a rocking movement to said shaft in a direction to release the keys of said second series.

3. In a machine of the class described, in combination, a recording mechanism including a case, a series of longitudinally disposed selector keys arranged side by side and slidable longitudinally in said case, an autographic register including a second case, paper controlling mechanism including a transversely disposed rock shaft journaled in said second case, an operating crank secured to one end of said shaft, a coupling member detachably connected with the opposite end of said shaft and journaled in the adjacent side wall of said first case, a locking element secured to said coupling member, a stop dog adapted to engage with said locking element in a manner preventing a rocking movement of said coupling member, and operative connections between said stop dog and said selector keys whereby a movement of one of said keys will release said stop dog from its locking engagement.

4. In a machine of the class described, in combination, a recording mechanism including a case, a series of longitudinally disposed selector keys arranged side by side and slidable longitudinally in said case, an autographic register including a second case, paper controlling mechanism including a transversely disposed rock shaft journaled in said second case, an operating crank mounted upon one end of said shaft, a coupling member having one end thereof detachably connected with the opposite end of said shaft, the opposite end of said coupling member being journaled in the adjacent side wall and extending within said first case, a cam secured to the extended end of said coupling member and having a shoulder thereon, a stop dog movably mounted upon the side wall of said case and adapted to releasably engage said shoulder, and operative connections between said stop dog and said selector keys whereby a movement of one of said keys will release said stop dog from its locking engagement and permit a rocking movement of said shaft.

5. In a machine of the class described, in combination, a recording mechanism including a case, a series of longitudinally disposed selector keys arranged side by side and slidable longitudinally in said case, an autographic register including a second case detachably connected with said first case, paper controlling mechanism including a transversely disposed rock shaft mounted in said second case, an operating crank mounted upon one end of said shaft, a coupling member having one end thereof detachably connected with the opposite end of said shaft, the opposite end of said coupling member being journaled in the side wall and extending within said second case, a locking mechanism associated with said coupling member, means for controlling said locking mechanism including a transversely disposed rock shaft journaled in said first case, and wiper arms secured to said rock shaft and engaging with said selector keys in a manner to rock said shaft and disengage said locking means when one of said selector keys is moved longitudinally.

6. In a machine of the class described, in combination, a recording mechanism including a case, a series of longitudinally disposed selector keys arranged side by side and slidable longitudinally in said case, numeral bars connected to and movable with said selector keys, a printing mechanism coöperating with said numeral bars, a striking bar engaging with said numeral bars, means for actuating said striking bar to cause said numeral bars to engage with said printing mechanism, said means including lever arms pivotally connected with the side walls of said case and carrying said striking bar, said lever arms being provided with forwardly extending step portions at their free ends, a rock shaft journaled in said case, arms secured to said rock shaft and engaging with said step portions, and means for rocking said shaft.

7. In a machine of the class described, in combination, a recording mechanism including a case, a series of movable selector keys mounted in said case, numeral bars connected to and movable with said keys, a printing mechanism coöperating with said numeral bars, a striking bar engaging with said numeral bars, an autographic register including a second case, paper controlling mechanism including a transversely disposed rock shaft journaled in said second case, an operating crank mounted upon one end of said shaft, a coupling member having one end thereof detachably connected with the opposite end of said shaft, the opposite end of said coupling member being journaled in the adjacent side wall of said first case, means for actuating said striking bar, said means including levers pivotally mounted in said first case and carrying said striking bar, a rock shaft journaled in said first case, arms secured to said rock shaft and engaging with said levers, means for rocking said shaft in a direction to actuate said striking bar, said means including a longitudinally movable link mounted in said first case, and a link actuated arm carried by said coupling member.

8. In a machine of the class described, in combination, a recording mechanism including a case having a hinged door at one end thereof, a series of longitudinally disposed selector keys arranged side by side and slidable longitudinally in said case, a series of numeral bars connected to and movable with said selector keys, a recording and printing mechanism associated with said numeral bars including a totals printing mechanism, said totals printing mechanism including a transversely disposed swinging striking bar, means for actuating said bar, said means including a rock shaft journaled in the walls of said case, an arm secured to said shaft and adapted to engage with said striking bar, a second depending arm secured to said shaft, and operative connections between said second arm and said hinged door whereby an opening movement of said door will actuate said striking bar.

9. In a machine of the class described, in combination, a recording mechanism including a case having a hinged door at one end thereof, a series of longitudinally disposed selector keys arranged side by side and slidable longitudinally in said case, a series of numeral bars connected to and movable with said selector keys, a recording and printing mechanism associated with said numeral bars including a totals printing mechanism, said totals printing mechanism including a transversely disposed swinging striking bar, means for actuating said bar, said means including a rock shaft journaled in the walls of said case, an arm secured to said shaft and adapted to engage with said striking bar, a second depending arm secured to said shaft, operative connections between said second arm and said hinged door whereby an opening movement of said door will actuate said striking bar, said operative connections including an arm movable with said door, a bell crank lever pivotally mounted upon the bottom of said case, a link connecting one arm of said lever with the arm movable with said door, and a slidable link mounted in said case having one end thereof pivotally connected with the lower end of said depending arm and its opposite end adapted to be engaged by the remaining arm of said bell crank lever.

10. In a machine of the class described, a recording machine including selector keys, type bars and a recording member adapted to depress said bars, an autographic register including paper feeding mechanism, means for holding said selector keys and type bars in a selected position, means controlled by said paper feeding mechanism for actuating said recording member to depress said bars, and independent means for depressing said bars to release them from said holding means.

11. In a machine of the class described, a slidably mounted selector bar, a numeral bar pivotally mounted to said selector bar, means for holding the numeral bar in a selected position, a recording member adapted to depress said numeral bar a certain predetermined distance to record the selected numeral, and means operable independent of said recording member for depressing said bar a lesser distance to release said bar.

12. In a machine of the class indicated, in combination, a slidably mounted selector key, a stop and numeral bar pivotally connected with said selector key and adapted to hold it in a selected position, means for depressing said numeral bar to a recording position and simultaneously releasing said selector key, and independent means for depressing said numeral bar to a key releasing position only 13. In a machine of the class indicated, in combination, a case, a series of selector keys slidably mounted within said case, a series of stop and numeral bars pivotally connected with said selector keys and movable therewith, a recording mechanism, means for depressing said numeral bars to a recording position and simultaneously releasing said selector keys, and independent means for releasing said selector keys, said means including a rock shaft journaled in said case, eccentrics mounted upon said rock shaft and engaging with said numeral bars, and a correction key adapted to rock said shaft.

14. In a machine of the class described, a plurality of type bars, means for longitudinally reciprocating said type bars, recording mechanism coöperating with said bars, means for holding said bars in a selected position, and a plurality of independent means for depressing said type bars to make the record and release said bars.

15. In a machine of the class described, a plurality of longitudinally reciprocable type bars, means for locking said bars in a predetermined position, means for depressing said bars a fixed amount to make the record and for simultaneously releasing the bars, and independent means for depressing said bars a lesser amount to release the bars from said locking means.

16. In a machine of the class described, recording mechanism including a plurality of longitudinally reciprocable type bars, a striking bar having means for locking said type bars in a selected position, means for supporting a strip of paper in the path of said type bars, an autographic register, paper feeding means therein and means controlled by said paper feeding means for actuating said striking bar.

HENRY M. CROUSE.
GEORGE G. NEWELL.